US007895235B2

(12) United States Patent
Baeza-Yates et al.

(10) Patent No.: US 7,895,235 B2
(45) Date of Patent: Feb. 22, 2011

(54) EXTRACTING SEMANTIC RELATIONS FROM QUERY LOGS (75) Inventors: Ricardo Baeza-Yates, Barcelona (ES); Alessandro Tiberi, Rome (IT)

(73) Assignee: Yahoo! Inc., Sunnyvale, CA (US)

( * ) Notice: Subject to any disclaimer, the term of this patent is extended or adjusted under 35 U.S.C. 154(b) by 365 days.

(21) Appl. No.: 11/960,353

(22) Filed: Dec. 19, 2007

(65) Prior Publication Data
US 2009/0164895 A1 Jun. 25, 2009

(51) Int. Cl.
G06F 7/00 (2006.01)
(52) U.S. Cl. .................. 707/791; 707/705; 707/798; 707/E17.112
(58) Field of Classification Search .............. None
See application file for complete search history.

(56) References Cited

U.S. PATENT DOCUMENTS

| 6,006,225 | A |   | 12/1999 | Bowman et al. |
| 6,073,135 | A | * | 6/2000  | Broder et al. ............. 1/1 |
| 6,169,986 | B1 |  | 1/2001  | Bowman et al. |
| 6,285,999 | B1 | * | 9/2001 | Page ..................... 1/1 |
| 6,556,983 | B1 |  | 4/2003  | Altschuler et al. |
| 6,598,051 | B1 | * | 7/2003 | Wiener et al. ............. 1/1 |
| 6,897,885 | B1 | * | 5/2005 | Hao et al. ............... 715/853 |
| 7,168,034 | B2 |  | 1/2007  | Hennings et al. |
| 7,194,454 | B2 | * | 3/2007 | Hansen et al. ............. 1/1 |
| 7,343,374 | B2 | * | 3/2008 | Berkhin ................... 707/5 |
| 7,603,348 | B2 | * | 10/2009 | He et al. ................. 1/1 |
| 7,603,349 | B1 | * | 10/2009 | Kraft et al. .............. 1/1 |
| 7,627,559 | B2 | * | 12/2009 | Srivastava et al. .......... 707/3 |
| 2005/0216533 | A1 | * | 9/2005 | Berkhin ................. 707/204 |
| 2005/0256866 | A1 | * | 11/2005 | Lu et al. ................. 707/5 |
| 2006/0136098 | A1 | * | 6/2006 | Chitrapura et al. ......... 700/262 |
| 2008/0275902 | A1 | * | 11/2008 | Burges et al. ............. 707/102 |
| 2009/0100085 | A1 |  | 4/2009 | Hampton |

OTHER PUBLICATIONS

Baeza-Yates, Ricardo "Graphs from Search Engine Queries", SOFSEM 2007: Theory and Practice of Computer Science, 33rd Conference on Current Trends in Theory and Practice of Computer Science, Harrachov, Czech Republic, Jan.20-26, 2007, Proceedings, (Jan. 26, 2007), 8 pages.
Baeza-Yates, Ricardo et al., "Extracting Semantic Relations from Query Logs", Proceedings of the 13th ACM SIGKDD International Conference on Knowledge Discovery and Data Mining, San Jose, California, Aug. 12-15, 2007, 76-85 pages.

* cited by examiner

Primary Examiner—Srirama Channavajjala
Assistant Examiner—Jessica N Le
(74) Attorney, Agent, or Firm—Fiala & Weaver P.L.L.C.

(57) ABSTRACT

Methods, systems, and apparatuses for associating queries of a query log are provided. The query log lists a plurality of queries and a set of clicked URLs for each query. Each query is designated to be a node of a plurality of nodes. A plurality of edges is determined. A URL is designated to be an edge for a pair of queries if the URL is indicated as clicked in the sets of clicked URLs for both queries of the pair. The nodes and edges are displayed in a graph. Each edge may be displayed in the graph as a line connected between a pair of nodes that correspond to the pair of queries of the pair of nodes. The edges may be classified. Furthermore, the edges and/or the nodes may be weighted. Edges and/or nodes may be filtered from display based on their weights and/or on other criteria.

22 Claims, 9 Drawing Sheets

| user identifier | query | timestamp | URL | ranking |
|---|---|---|---|---|
| 11111 | wcca | 07-11-2007 09:34 | wcca.wicourts.gov | 1 |
| 11112 | dmv ny | 07-11-2007 09:37 | www.nydmv.state.ny.us | 3 |
| ... | ... | ... | ... | ... |

502
designate each query of the plurality of queries to be a node of a plurality of nodes 504
determine a plurality of edges by designating a URL to be an edge for a pair of queries if the URL is indicated as clicked in a set of clicked URLs for a first query of the pair and in a set of clicked URLs for a second query of the pair 506
display the plurality of nodes and the plurality of edges in a graph

| query | clicked URL |
|---|---|
| wcca | wcca.wicourts.gov |
| dmv ny | www.nydmv.state.ny.us<br>www.nydmv.state.ny.us/license.htm |
| area code list | www.nanpa.com/area_codes |
| ccap | wcca.wicourts.gov |
| wisconsin circuit court | wcca.wicourts.gov<br>en.wikipedia.org/wiki/Wisconsin_Circuit_Court_Access |
| court records | www.court-records.net<br>wcca.wicourts.gov |
| phone area codes | www.thedirectory.org/pref<br>www.nanpa.com/area_codes |
| department of motor vehicles | www.nysdmv.com |
| wisconsin circuit court access | wcca.wicourts.gov<br>en.wikipedia.org/wiki/Wisconsin_Circuit_Court_Access<br>www.wicourts.gov/casesearch.htm |
| ... | ... |

EXTRACTING SEMANTIC RELATIONS FROM QUERY LOGS

BACKGROUND OF THE INVENTION

1. Field of the Invention

The present invention relates to search engine query logs, and in particular, to the determining of relationships between queries in search engine query logs.

2. Background Art

A search engine is an information retrieval system used to locate documents and other information stored on a computer system. Search engines are useful at reducing an amount of time required to find information. One well known type of search engine is a Web search engine which searches for documents, such as web pages, on the "World Wide Web." Online services such as LexisNexis™ and Westlaw™ also enable users to search for documents provided by their respective services, including articles and court opinions. Further types of search engines include personal search engines, mobile search engines, and enterprise search engines that search on intranets, among others.

To perform a search, a user of a search engine supplies a query to the search engine. The query contains one or more words/terms, such as "hazardous waste" or "country music." The terms of the query are typically selected by the user in an attempt to find particular information of interest to the user. The search engine returns a list of documents relevant to the query. In a Web-based search, the search engine typically returns a list of uniform resource locator (URL) addresses for the relevant documents.

If the scope of the search resulting from a query is large, the returned list of documents may include thousands or even millions of documents. In situations where a large number of documents are returned by a search, documents of interest to the user may not appear near the top of the returned list, making it difficult for the user to locate the documents of interest among all the other documents. In such a case, the user may attempt another search using a revised query. In other situations, the returned list may not include information of interest to the user. Again, in such a case, the user may attempt another search using different query terms. The user may continue to input different queries into the search engine in further attempts to hone in on the documents of interest to the user.

Thus, searching for information by entering query terms into a search engine can be challenging. Finding the right combination of query terms to find documents of interest can be difficult and time consuming. Therefore, what is needed are ways of performing more efficient searches for information using search engines, including ways of more efficiently determining revised query terms that will aid users in honing in on documents of interest during a search.

BRIEF SUMMARY OF THE INVENTION

Methods, systems, and apparatuses for associating queries of a query log are provided. A query log lists a plurality of queries and one or more URLs for each query of the plurality of queries. Relationships are determined between queries in the query log based on sets of clicked URLs for the queries. A graph is generated to display the determined relationships.

For instance, in a first aspect of the present invention, each query is designated to be a node of a plurality of nodes. A plurality of edges is determined from the URLs associated with the queries. A URL is designated to belong to an edge for a pair of queries if the URL is indicated as clicked in the sets of clicked URLs for both of the first query and the second query of the pair. The plurality of nodes and the plurality of edges are displayed in a graph. Each edge may be displayed in the graph as a line connected between the pair of nodes associated with the pair of queries of the edge.

In a further aspect, the edges may be classified. For instance, the edges may be classified into three categories. An edge is assigned a first classification if a first query and a second query of the pair of queries associated with the edge have substantially equivalent sets of clicked URLs. An edge is assigned a second classification if the set of clicked URLs of the first query is lesser in size than, and substantially included in the set of clicked URLs of the second query. An edge is assigned a third classification if the set of clicked URLs of the first query is overlapping with the set of clicked URLs of the second query and the edge is not classifiable according to the first or second classifications.

Furthermore, the edges may be weighted. A weight may be calculated for each edge. The edge may be displayed in the graph to indicate the calculated weight. In a further aspect, edges may be filtered from display based on their calculated weight. For example, edges may be displayed in the graph having calculated weights greater than a predetermined weight threshold.

Furthermore, the nodes may be weighted. A weight may be calculated for each node. The nodes may be displayed in the graph to indicate the calculated weight. In a further aspect, nodes may be filtered from display based on their calculated weight. For example, nodes may be displayed in the graph for queries having sets of clicked URLs that include numbers of clicked URLs greater than a predetermined threshold number of clicked URLs.

Classification of edges enables semantic relations among queries to be determined: The first classification corresponds to a pair of queries that are synonyms, the second classification corresponds to a pair of queries where one of them is more specific with regard to a particular topic, and the third classification corresponds to related queries. The accuracy of the classification results can be tuned using edge and/or node weights.

In another aspect of the present invention, a query log analyzing system includes a query log parser and an edge determiner. The query log parser is configured to receive a query log that lists a plurality of queries and a plurality of clicked URLs. The query log parser parses the query log, and designates each query of the plurality of queries to be a node. The edge determiner is configured to determine a plurality of edges for the plurality of URLs of the query log.

The query log analyzing system may further include a display module. The display module is configured to enable display the plurality of nodes and the plurality of edges in a graph.

In a further aspect, the query log analyzing system may include an edge classifier configured to classify each edge.

In a still further aspect, the query log analyzing system may include an edge weight calculator configured to calculate a weight for each edge. The query log analyzing system may further include an edge filter configured to filter edges from display in the graph based on the calculated weights and/or on other criteria.

In a still further aspect, the query log analyzing system may include a node weight calculator configured to calculate a weight for each node. The query log analyzing system may include a node filter configured to filter nodes from display in the graph based on the calculated node weights and/or on other criteria.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
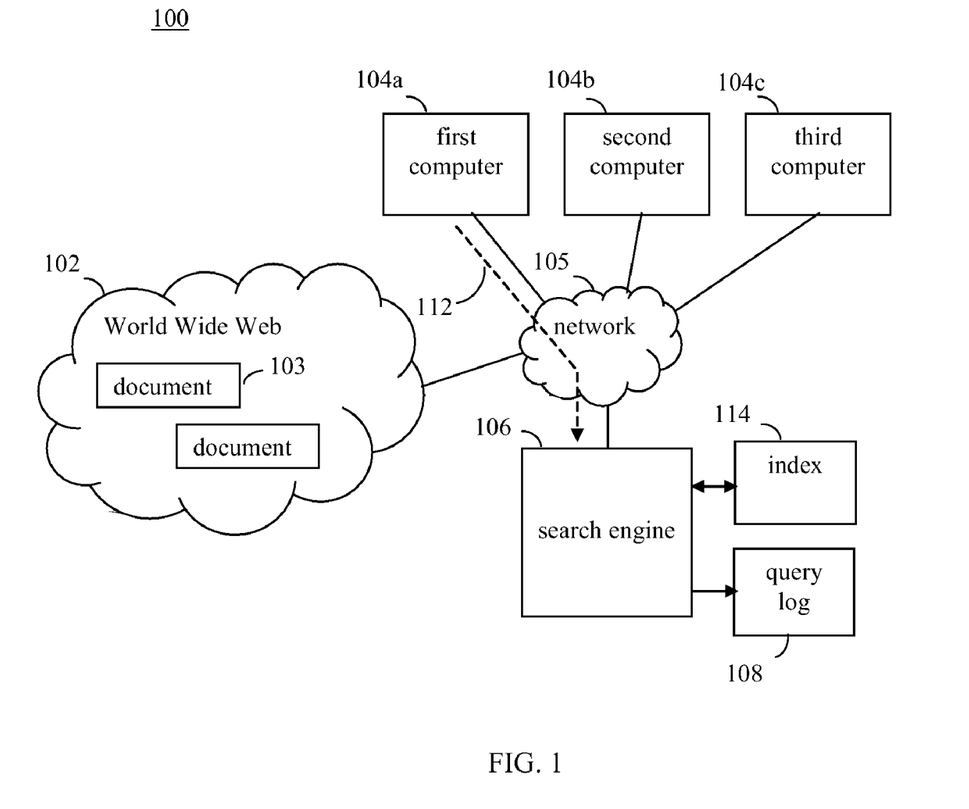
FIG. 1 shows a document retrieval system.

Embodiments of the present invention provide methods and systems that enable the determination of relationships between queries in search engine query logs. Such determined relationships may be used to make subsequent searches using the search engine more efficient. FIG. 1 shows an example environment in which embodiments of the present invention may be implemented. FIG. 1 is provided for illustrative purposes, and it is noted that embodiments of the present invention may be implemented in alternative environments. FIG. 1 shows a document retrieval system 100, according to an example embodiment of the present invention. As shown in FIG. 1, system 100 includes a search engine 106. One or more computers 104, such as first-third computers 104a-104c, are connected to a communication network 105. Network 105 may be any type of communication network, such as a local area network (LAN), a wide area network (WAN), or a combination of communication networks. In embodiments, network 105 may include the Internet and/or an intranet. Computers 104 can retrieve documents from entities over network 105. In embodiments where network 105 includes the Internet, a collection of documents, including a document 103, which form a portion of World Wide Web 102, are available for retrieval by computers 104 through network 105. On the Internet, documents may be identified/located by a uniform resource locator (URL), such as http://www.yahoo.com, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 accesses a stored index 114 that indexes documents, such as documents of World Wide Web 102. A user of computer 104a who desires to retrieve one or more documents relevant to a particular topic, but does not know the identifier/location of such a document, may submit a query 112 to search engine 106 through network 105. Search engine 106 receives query 112, and analyzes index 114 to find documents relevant to query 112. For example, search engine 106 may determine a set of documents indexed by index 114 that include terms of query 112. The set of documents may include any number of documents, including tens, hundreds, thousands, or even millions of documents. Search engine 106 may use a ranking or relevance function to rank documents of the retrieved set of documents in an order of relevance to the user. Documents of the set determined to most likely be relevant may be provided at the top of a list of the returned documents in an attempt to avoid the user having to parse through the entire set of documents.

Search engine 106 may be implemented in hardware, software, firmware, or any combination thereof. For example, search engine 106 may include software/firmware that executes in one or more processors of one or more computer systems, such as one or more servers. Examples of search engine 106 that are accessible through network 105 include, but are not limited to, Yahoo! Search™ (at http://www.yahoo.com), Ask.com™ (at http://www.ask.com), Microsoft® Live Search (at http://www.live.com), and Google™ (at http://www.google.com).

Figure 2:
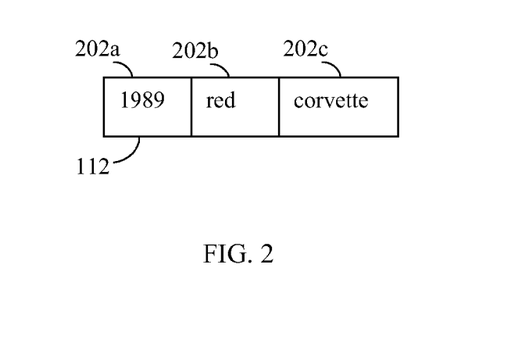
FIG. 2 shows an example query that may be submitted by a user to a search engine.

FIG. 2 shows an example query 112 that may be submitted by a user of one of computers 104a-104c of FIG. 1 to search engine 106. Query 112 includes one or more terms 202, such as first, second, and third terms 202a-202c shown in FIG. 2. Any number of terms 202 may be present in a query. As shown in FIG. 2, terms 202a-202c of query 112 are "1989," "red," and "corvette." Search engine 106 applies these terms 202a-202c to index 114 to retrieve a document locator, such as a URL, for one or more indexed documents that match 1989," "red," and "corvette," and may order the list of documents according to a ranking. As shown in FIG. 1, search engine 106 may generate a query log 108. Query log 108 is a record of searches that are made using search engine 106. Query log 108 may include a list of queries, by listing query terms (e.g., terms 202 of query 112) along with further information/attributes for each query, such as a list of documents resulting from the query, a list/indication of documents in the list that were selected/clicked on ("clicked") by a user reviewing the list, a ranking of clicked documents, a timestamp indicating when the query is received by search engine 106, an IP (internet protocol) address identifying a unique device (e.g., a computer, cell phone, etc.)) from which the query terms were submitted, an identifier associated with a user who submits the query terms (e.g., a user identifier in a web browser cookie), and/or further information/attributes.

Figure 3:
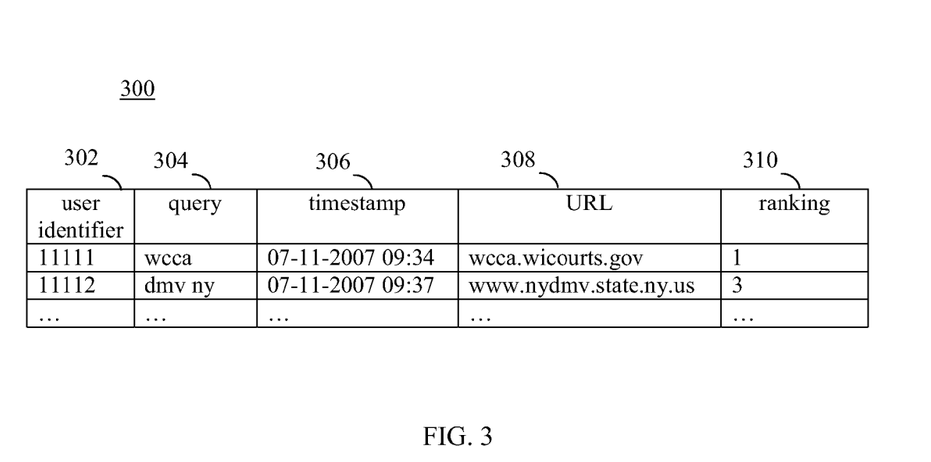
FIG. 3 shows an example query log.

For instance, FIG. 3 shows a query log 300 as an example of query log 108 shown in FIG. 1. In the example of FIG. 3, query log 300 includes a first column 302, a second column 304, a third column 306, a fourth column 308, and a fifth column 310. First column 302 lists user identifiers (e.g., anonymous identification numbers) for users that submit queries to search engine 106. Second column 304 lists queries submitted by the users listed in column 302. Third column 306 lists a timestamp indicating a date/time at which the corresponding query listed in column 304 was submitted to search engine 106. Fourth column 308 lists one or more URLs of a resulting document list for the corresponding query listed in column 304. Fifth column 310 lists a ranking in the resulting document list for the corresponding document listed in column 308. For example, a first row of query log 300 lists user identifier 11111 in column 302, "wcca" in column 304 as a query, a timestamp of 9:34 am, Jul. 11, 2007, in column 306, wcca.wicourts.gov as a document URL in column 308 resulting from the query of "wcca," and a ranking of 1 for wcca.wicourts.gov in the resulting document list.

Although data related to two submitted queries is shown in FIG. 3 for query log 300, a query log may include any amount of data, including data for hundreds, thousands, and even millions of queries. Furthermore, it is noted that in column 308, query log 300 lists documents that were clicked by the user in the returned document list for the corresponding query in column 304. In another implementation of query log 300, documents that were not clicked by the user in the returned document list for the query of column 304 may also be listed in column 308 for each query.

If the scope of the search resulting from a query is large, the returned list of documents may include thousands or even millions of documents. When searching for information of interest, a user may attempt many searches using search engine 106. The user may input any number of different queries into search engine 106 in an attempt to hone in on the documents of interest to the user. Embodiments of the present invention provide ways of analyzing query logs to help improve subsequent searches for information using search engine 106. Example embodiments of the present invention are described in detail in the following section.

Example Query Log Analysis Embodiments

Example embodiments are described for analyzing query logs and for enabling improved searches using search engines. The example embodiments described herein are provided for illustrative purposes, and are not limiting. Further structural and operational embodiments, including modifications/alterations, will become apparent to persons skilled in the relevant art(s) from the teachings herein.

Figure 4:
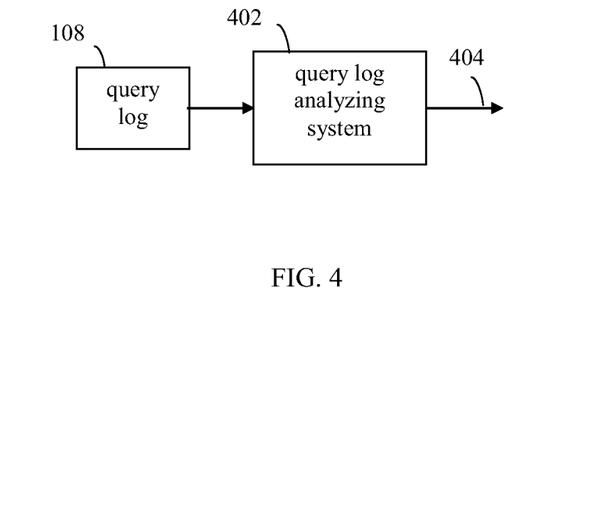
FIG. 4 shows a block diagram of a query log analyzing system, according to an example embodiment of the present invention.

FIG. 4 shows a query log analyzing system 402, according to an example embodiment of the present invention. As shown in FIG. 4, query log system 402 receives query log 108. Query log analyzing system 402 is configured to determine semantic relations between queries listed in query log 108, including implicitly stored relationship information stored in query log 108. As shown in FIG. 4, query log system 402 generates query relationships 404, which may be output in a form that may be displayed, stored, and/or otherwise received and/or used. For example, in an embodiment, query relationships 404 may be provided to a user accessing search engine 106 in a textual form, graphical form, and/or electronic file form, to aid the user in performing a more efficient subsequent search. For instance, the user may use alternate queries present in query relationships 404 to aid the user in the user's current search. In an embodiment, query log system 402 may classify the query relationships present in query relationships 404. Query log system 402 may include hardware, software, firmware, or any combination thereof, to perform its functions.

Figure 5:
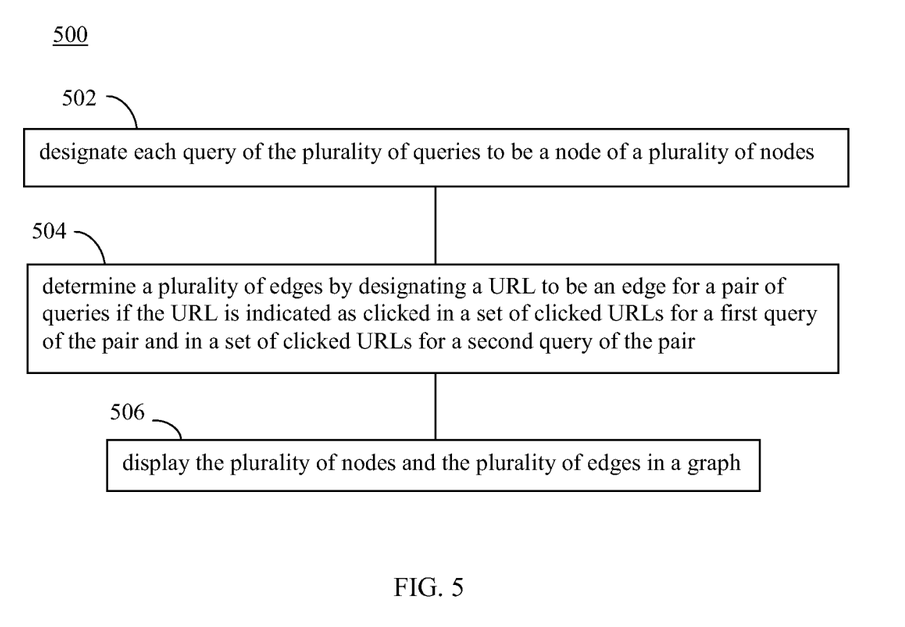
FIG. 5 shows a flowchart for associating queries of a query log, according to an example embodiment of the present invention.
Figure 6:
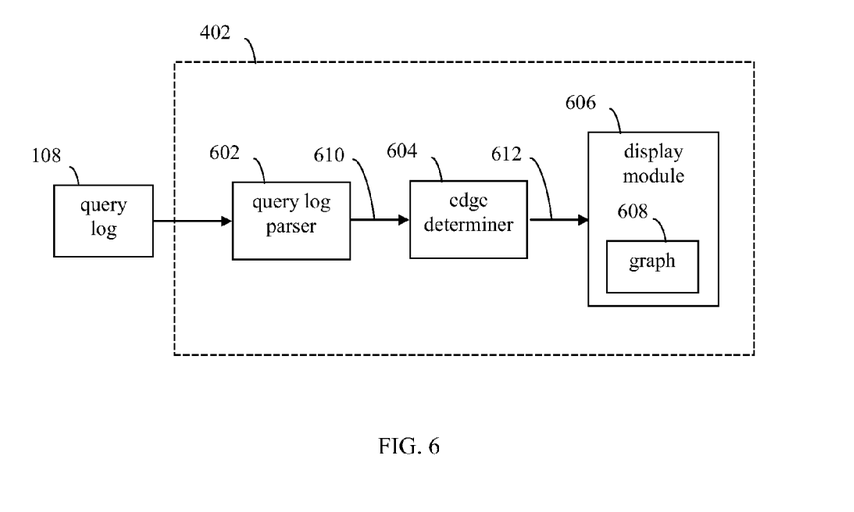
FIG. 6 shows a block diagram of the query log analyzing system of FIG. 4, according to an example embodiment of the present invention.

FIG. 5 shows a flowchart 500 for associating queries of a query log, according to an example embodiment of the present invention. Flowchart 500 may be performed by query log analyzing system 402. FIG. 6 shows a block diagram of an example of query log analyzing system 402, according to an embodiment of the present invention. As shown in FIG. 6, in an embodiment, query log analyzing system 402 may include a query log parser 502, an edge determiner 504, and a display module 506. Further structural and operational embodiments will be apparent to persons skilled in the relevant art(s) based on the discussion regarding flowchart 500. Flowchart 500 is described as follows with respect to system 402 shown in FIG. 6, for illustrative purposes.

Flowchart 500 begins with step 502. In step 502, each query of the plurality of queries is designated to be a node of a plurality of nodes. For example, in an embodiment, query log analyzing system 402 receives query log 300. As shown in the example of FIG. 3, query log 300 may list a plurality of queries (e.g., column 302) and a plurality of clicked document locators, such as URLs (e.g., column 304). As shown in FIG. 3, each query has an associated set of one or more clicked URLs. Each query of the query log may be designated as a node in a plurality of nodes, according to step 502. Query log parser 602 shown in FIG. 6 may perform step 502 for system 402 in an embodiment. As shown in FIG. 6, query log parser 602 receives query log 108. Query log parser 602 is configured to parse query log 108 for queries, and is configured to assign located queries to corresponding nodes.

Figure 7:
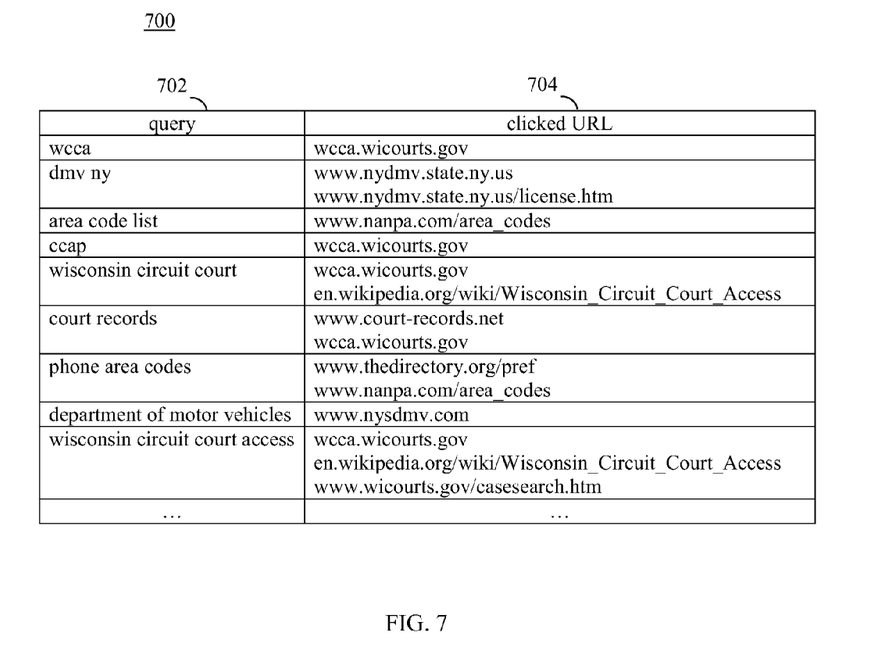
FIG. 7 shows a table including a list of queries and a list of clicked URLs parsed from a query log, according to an example embodiment of the present invention.

For instance, FIG. 7 shows a table 700 including a list of queries 702 that may be parsed from a query log by query log parser 602, according to an example embodiment of the present invention. In an embodiment, query log parser 602 lists each query of query log 108 in list of queries 702, and designates each query in list of queries 702 as a node. For example, "wcca," "dmv ny," "area code list," "ccap," "wisconsin circuit court," "court records," "phone area codes," "department of motor vehicles," and "wisconsin circuit court access" are shown in FIG. 7 as an example of list of queries 702. Each of these queries may be designated as a node by query log parser 602.

Note that in a first embodiment, each query present in query log 108 may be designated as a node by query log parser 602. Alternatively, in another embodiment, query log parser 602 may designate a subset of the queries listed in query log 108 to be nodes. The subset of the queries may be designated as nodes to create a smaller node set for any number of reasons, such as reducing computation time (e.g., particularly when very large numbers of queries are present), focusing on a particular type of query, and/or for any other purpose. The subset of queries may be selected by query log parser 602 in any manner, including by random selection, by selecting every nth query to be included in the subset, by selecting particular queries by types of terms, number of terms, etc.

In an embodiment, query log parser 602 may also parse through query log 108 for URLs corresponding to queries of list of queries 702, to generate a list of clicked URLs 704 shown in FIG. 7. As shown in FIG. 7, a set of one or more clicked URLs is present in list of clicked URLs 704 for each query. As shown in FIG. 6, query log parser 602 generates a parsed query log data signal 610, which may include list of queries 702 and list of clicked URLs 704. Query log parser 602 may include hardware, software, firmware, or any combination thereof, to perform its functions.

In step 504, a plurality of edges is determined by designating a URL to be an edge for a pair of queries if the URL is indicated as clicked in a set of clicked URLs for a first query of the pair and in a set of clicked URLs for a second query of the pair. For example, in an embodiment, edge determiner 604 shown in FIG. 6 receives parsed query log data signal 610. Edge determiner 604 determines whether an edge exists for each pair of queries in list of queries 702 by comparing the sets of URLs of the pair of queries. If a clicked URL is present in both of a set of clicked URLs for a first query of the pair and a set of clicked URLs for a second query of the pair, an edge is designated for the pair of queries.

For instance, referring to table 700 shown in FIG. 7, a first query pair of "wcca" and "dmv ny" may be analyzed by edge determiner 604. As indicated by list of clicked URLs 704, the set of URLs for "wcca" (wcca.wicourts.gov) does not include any URLs in common with the set of URLs for "dmv ny" (www.nydmv.state.ny.us and www.nydmv.state.ny.us/license.htm). Thus, edge determiner 604 does not determine an edge for the first query pair "wcca" and "dmv ny." With regard to a second query pair of "wcca" and "ccap," the set of URLs for "wcca" does include a URL in common with the set of URLs for "ccap"—wcca.wicourts.gov. Thus, edge determiner 604 does determine an edge for the second query pair "wcca" and "ccap." Edge determiner 604 may determine whether edges are present between all combinations of pairs of queries in list of queries 702 to determine a plurality of edges. Edge determiner 604 generates a node and edge data signal 612, which includes a list of nodes (e.g., list of queries 702) and the determined plurality of edges. Edge determiner 604 may include hardware, software, firmware, or any combination thereof, to perform its functions.

In step 506, the plurality of nodes and the plurality of edges are displayed in a graph. For example, as shown in FIG. 6, display module 606 receives node and edge data signal 612, and generates a graph 608 providing a graphical indication of the nodes designated in step 502, and of the edges determined in step 504. Graph 608 may be configured in a variety of ways to show nodes and edges.

Figure 8:
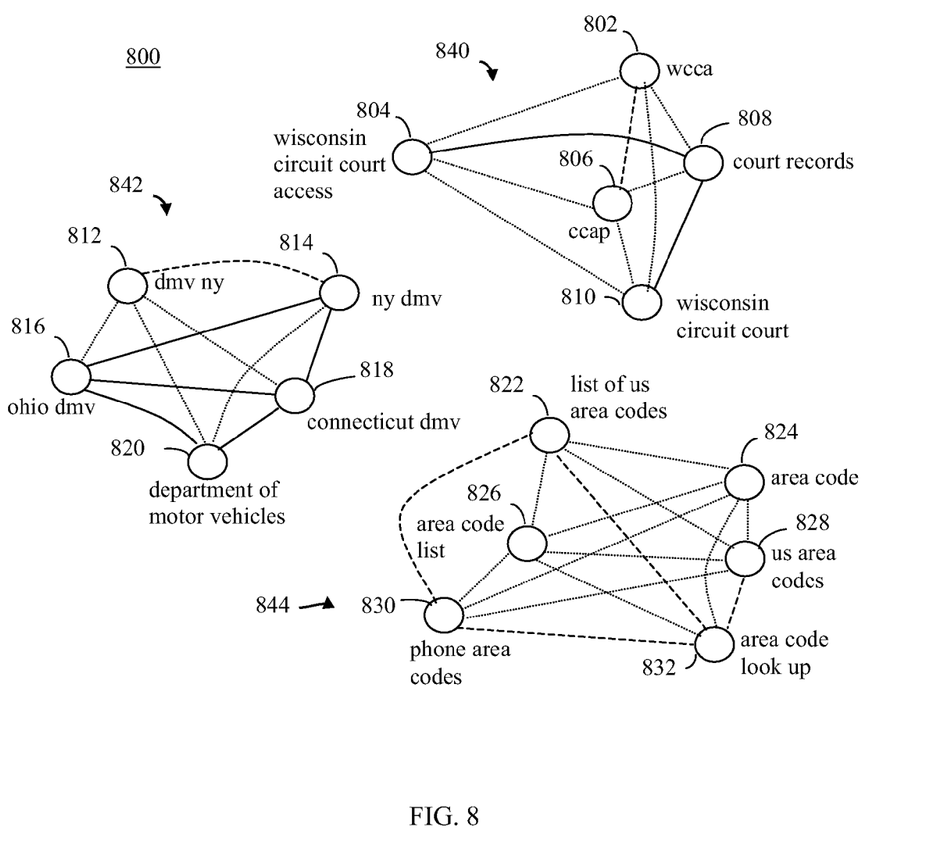
FIG. 8 shows an example graph of nodes and edges, according to an embodiment of the present invention.

For example, FIG. 8 shows a graph 800 as an example of graph 608, according to an embodiment of the present invention. Graph 800 is shown in FIG. 8 for purposes of illustration. In embodiments, graph 800 may include any number of nodes and edges, including 10s, 100s, 1000s, and even more nodes and/or edges. As shown in FIG. 8, a plurality of nodes are indicated (e.g., as circular objects), and edges are shown as lines (e.g., straight or curved) connected between pairs of nodes. FIG. 8 shows a plurality of nodes corresponding to the queries of list of queries 702 (and further including example queries not explicitly shown in FIG. 7). The plurality of nodes in FIG. 8 includes a first node 802 (query "wcca"), a second node 804 (query "wisconsin circuit court access"), a third node 806 (query "ccap"), a fourth node 808 (query "court records"), a fifth node 810 (query "wisconsin circuit court"), a sixth node 812 (query "dmv ny"), a seventh node 814 (query "ny dmv"), an eighth node 816 (query "ohio dmv"), a ninth node 818 (query "connecticut dmv"), a tenth node 820 (query "department of motor vehicles"), an eleventh node 822 (query "list of us area codes"), a twelfth node 824 (query "area code"), a thirteenth node 826 (query "area code list"), a fourteenth node 828 (query "us area codes"), a fifteenth node 830 (query "phone area codes"), and a sixteenth node 832 (query "area code look up").

As shown in FIG. 8, edges may be indicated in graph 800 by a line connected between a pair of nodes displayed in the graph that correspond to the pair of queries having sets of clicked URLs indicating the URL of the edge as clicked (as determined in step 504). For example, as shown in FIG. 8, an edge (determined as described above) is connected between node 802 and node 806, indicating a relationship between queries "wcca" and "ccap." Furthermore, as described above, an edge was not determined for queries "wcca" and "dmv ny," and thus an edge is not present in FIG. 8 between nodes 802 and 812. Further description regarding the representation of queries and clicked URLs in graphs as nodes and edges is provided in R. Baeza-Yates, "Graphs from Search Engine Queries," printed in "SOFSEM 2007: Theory and Practice of Computer Science," Springer Berlin/Heidelberg, Vol. 4362/2007, January 2007, pp. 1-8, which is incorporated by reference herein in its entirety.

According to flowchart 500, a plurality of nodes and edges corresponding to queries and clicked URLs are generated and displayed in graph 800. Relationships between queries are indicated by graph 800. For instance, clusters of nodes having edges connecting them are formed according to flowchart 500. Nodes in such a cluster have queries that are related to each other. Queries of a cluster may be useful to be used in common searches using search engine 106, to more efficiently locate documents of interest. In the example of FIG. 8, first, second, and third clusters 840, 842, and 844 are shown. First cluster 840 includes first node 802 (query "wcca"), second node 804 (query "wisconsin circuit court access"), third node 806 (query "ccap"), fourth node 808 (query "court records"), and fifth node 810 (query "wisconsin circuit court"), indicating a relationship between the queries of nodes 802-810. Second cluster 842 includes sixth node 812 (query "dmv ny"), seventh node 814 (query "ny dmv"), eighth node 816 (query "ohio dmv"), ninth node 818 (query "connecticut dmv"), and tenth node 820 (query "department of motor vehicles"), indicating a relationship between the queries of nodes 812-820. Third cluster 844 includes eleventh node 822 (query "list of us area codes"), twelfth node 824 (query "area code"), thirteenth node 826 (query "area code list 826"), fourteenth node 828 (query "us area codes"), fifteenth node 830 (query "phone area codes"), and sixteenth node 832 (query "area code look up"), indicating a relationship between the queries of nodes 822-832.

Figure 9:
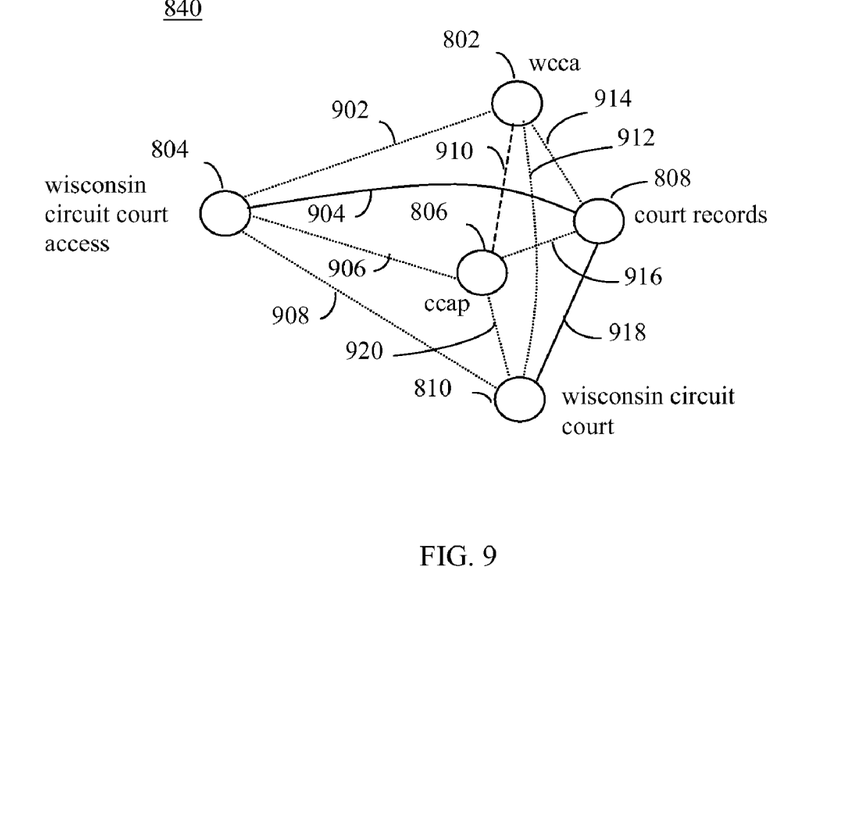
FIG. 9 shows a cluster of nodes and edges from the graph of FIG. 8, according to an example embodiment of the present invention.

FIG. 9 show first cluster 842. As shown in FIG. 9, a first edge 902 is connected between first node 802 and second node 804. A second edge 904 is connected between second node 804 and fourth node 808. A third edge 906 is connected between second node 804 and third node 806. A fourth edge 908 is connected between second node 804 and fifth node 810. A fifth edge 910 is connected between first node 802 and third node 806. A sixth edge 912 is connected between first node 802 and fifth node 810. A seventh edge 914 is connected between first node 802 and fourth node 808. An eighth edge 916 is connected between third node 806 and fourth node 808. A ninth edge 918 is connected between fourth node 808 and fifth node 810. A tenth edge 920 is connected between third node 806 and fifth node 810.

In an embodiment, because cluster 842 includes nodes 802-810, the queries related to nodes 802-810 are determined to be related. This determined relationship may be used to perform more efficient subsequent searches by users using these queries. For instance, when a user submits a query 112 that matches one of the queries associated with nodes 802-810 to search engine 106, search engine 106 may suggest one or more of the other queries of nodes 802-810 to the user for use during subsequent searches.

Figure 10:
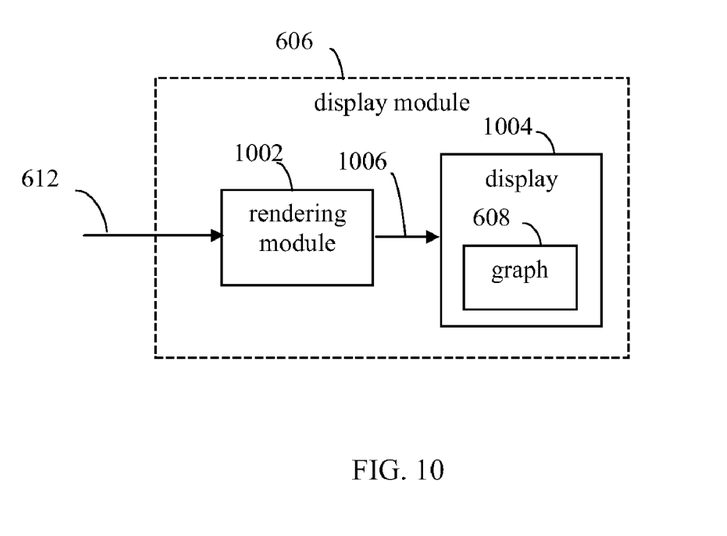
FIG. 10 shows a block diagram of a display module, according to an example embodiment of the present invention.

Display module 606 may be implemented in any manner to enable display of graph 608. For instance, display module 606 may include a display and/or further display related functionality. For example, FIG. 10 shows a block diagram of display module 606, according to an example embodiment of the present invention. In the example of FIG. 10, display module 606 includes a rendering module 1002 and a display 1004. Rendering module 1002 receives node and edge data signal 612. Rendering module 1002 is configured to generate graphical data 1006 from node and edge data signal 612 that can be received for display by display 1004 as graph 608. Rendering module 1002 may include hardware, software, firmware, or any combination thereof, to perform its functions. Display 1004 receives graphical data 1006, and generates and displays graph 608. Display 1004 may be any type of display mechanism, including a cathode ray tube (CRT) monitor, a flat panel display such as an LCD (liquid crystal display) panel, or other display mechanism.

Figure 11:
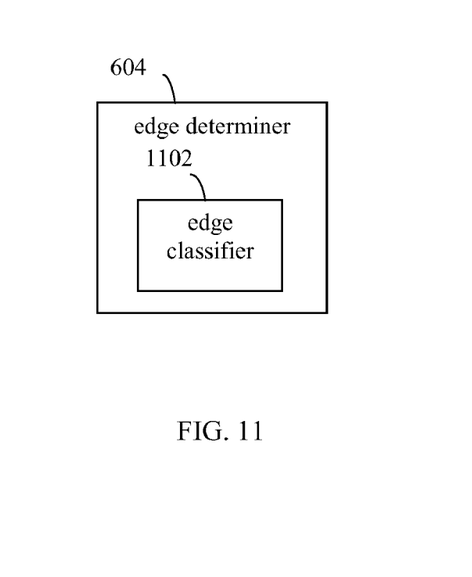
FIG. 11 shows a block diagram of an edge determiner, according to an example embodiment of the present invention.
Figure 12:
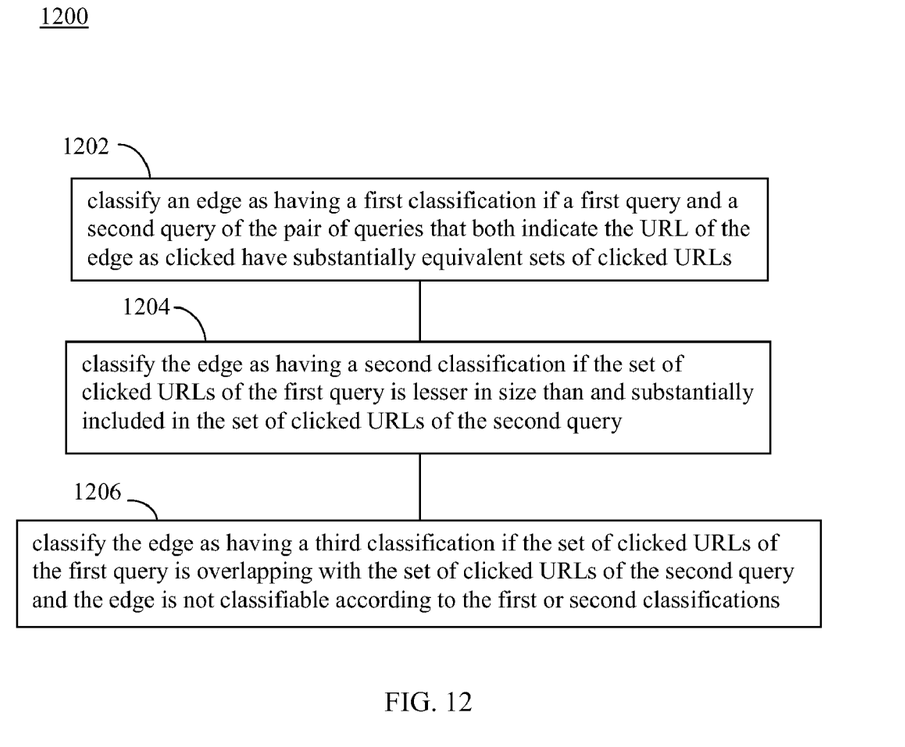
FIG. 12 shows a flowchart for classifying edges, according to an example embodiment of the present invention.

In an embodiment, edge determiner 604 may be configured to classify determined edges. Edges may be classified to indicate a type and/or quality of relationship between queries associated with the nodes connected by the edge in graph 608. For instance, edges may be classified to indicate a close relationship (e.g., equivalent or inclusive) or a lesser relationship (e.g., overlapping). In an embodiment, as shown in FIG. 11, edge determiner 604 may include an edge classifier 1102. Edge classifier 1102 may include hardware, software, firmware, or any combination thereof, to perform its functions. Edge classifier 1102 is configured to classify determined edges. FIG. 12 shows a flowchart 1200 for classifying edges, according to an example embodiment of the present invention. In an embodiment, flowchart 1200 may be performed by edge classifier 1102. Further structural and operational embodiments will be apparent to persons skilled in the relevant art(s) based on the discussion regarding flowchart 1200.

Flowchart 1200 begins with step 1202. In step 1202, an edge is classified as having a first classification if a first query and a second query indicating the URL of the edge as clicked have substantially equivalent sets of clicked URLs. For example, if the queries of the two nodes that the edge is determined to connect have substantially equivalent sets of clicked URLs, the edge may be classified as having a first classification, which may be referred to as an "equivalent" relationship, or having "identical cover." An example of such an edge is edge 910 shown in FIG. 9. Nodes 802 and 806 that are connected by edge 910 have identical sets of clicked URLs (e.g., queries "wcca" and "ccap" both include the same URL, wcca.wicourts.gov, as indicated in FIG. 7). Because nodes 802 and 806 include identical sets of clicked URLs, edge 910 is classified according to the first classification.

In step 1204, the edge is classified as having a second classification if the set of clicked URLs of the first query is lesser in size than and substantially included in the set of clicked URLs of the second query. For example, if one of the queries of the two nodes has a set of clicked URLs that is completely contained by the set of clicked URLs of the other query, but is lesser in size, the edge may be classified as having a second classification, which may be referred to as one query being contained in the other query, or having "strict complete cover." An example of such an edge is edge 902 shown in FIG. 9. Nodes 802 and 804 are connected by edge 902. Query "wcca" of node 802 has a set of clicked URLs of wcca.wicourts.gov. Query "wisconsin circuit court access" of node 804 has the following set of three clicked URLs as indicated by FIG. 7:

wcca.wicourts.gov
en.wikipedia.org/wiki/Wisconsin_Circuit_Court_Access
www.wicourts.gov/casesearch.htm Both queries include the URL wcca.wicourts.gov, but the query of node 804 includes further URLs. Because the query of node 802 is contained in the query of node 806, the set of clicked URLs of "wcca" is lesser in size than, but substantially included in the set of clicked URLs of "wisconsin circuit court access," and thus edge 902 is classified according to the second classification.

In step 1206, the edge is classified as having a third classification if the set of clicked URLs of the first query is overlapping with the set of clicked URLs of the second query and the edge is not classifiable according to the first or second classifications. For example, if the queries of the two nodes have sets of clicked URLs that include at least one common URL, but that each include at least one URL not contained in the other set, the edge may be classified as having a third classification, which may be referred to as being generically related, or having "partial cover." An example of such an edge is edge 904 shown in FIG. 9. Nodes 804 and 808 are connected by edge 904. Query "wisconsin circuit court access" of node 804 has the following set of three clicked URLs as indicated by FIG. 7:

wcca.wicourts.gov
en.wikipedia.org/wiki/Wisconsin_Circuit_Court_Access
www.wicourts.gov/casesearch.htm Query "court records" of node 808 has the following set of two clicked URLs as indicated by FIG. 7:

wcca.wicourts.gov
www.court-records.net

Both queries include the URL wcca.wicourts.gov, but the query of node 804 includes two URLs not included in the set of URLs for the query of node 808, and the query of node 808 includes one URL not included in the set of URLs for the query of node 804. The sets of URLs of the queries of nodes 804 and 808 are not equivalent (fail step 1202), nor is one of the sets of URLs contained by the other set of URLs (fail step 1204). Because the queries of nodes 804 and 808 are overlapping, and do not fall under the classifications of steps 1202 and 1204, edge 904 is classified according to the third classification.

When edge classifier 1102 is present, edge determiner 604 may generate node and edge data signal 612 (in FIG. 6) to include the edge classifications generated by edge classifier 1102 for edges. Classification of edges enables semantic relations among queries to be determined: The first classification corresponds to a pair of queries that are synonyms, the second classification corresponds to a pair of queries where one of them is more specific with regard to a particular topic, and the third classification corresponds to related queries. The accuracy of the classification results can be tuned using edge and/or node weights.

Note that edges may be displayed in graph to graphically indicate the classification of the edge. For instance, an edge may displayed with a particular color, dot pattern, dash pattern, a gray scale level, any other graphical and/or alphanumeric pattern, or any combination thereof, to indicate a classification of the edge. For example, in FIG. 9, edge 910 is displayed as a dashed line to indicate that edge 910 is classified according to the first classification. Edge 902 (and edges 906, 908, 912, 914, 916, and 920) is displayed as a dotted line to indicate that edge 902 is classified according to the second classification. Edge 904 (and edge 918) is displayed as a solid line to indicate that edge 904 is classified according to the third classification. In another example, edge 902 may be displayed as a red line, edge 910 may displayed as a green line, and edge 904 may be displayed as black line, to respectively indicate the first, second, and third classifications.

For further description of examples of classifying edges, refer to Baeza-Yates, R. and Tiberi, A., "Extracting Semantic Relations from Query Logs," Proceedings of the 13th ACM SIGKDD International Conference on Knowledge Discovery and Data Mining, Association for Computing Machinery (ACM), San Jose, Calif., pages 76-85, Aug. 12-15, 2007 ("Baeza-Yates/Tiberi article") which is incorporated by reference herein in its entirety.

Note that in further embodiments, the classifications of flowchart 1200 can be relaxed using a relaxation parameter, α. Classifications may be relaxed using relaxation parameter α in any manner, as desired for a particular application. For instance, in an embodiment, a first query (q1) is α-included in a second query (q2) if the Euclidean norm of the vector obtained by projecting the first query (q1) on the URLs it shares with the second query (q2) is at least α. This may be represented in equation form as follows:

$$q1 \subseteq_\alpha q2 \text{ if } \sqrt{\Sigma_{u \in UC(q1,q2)} q1(u)^2} \geq \alpha \qquad \text{Equation 1}$$

where
 u=a clicked URL,
 UC=the set of URLs clicked for a query, and
 $UC(q1,q2) = UC_{q1} \cap UC_{q2}$.

Thus, in an embodiment of step 1202, rather than requiring strict equivalence as described above, a pair of queries associated with nodes may be classified according to the first classification if they are substantially equivalent, as relaxed by the relaxation parameter α. In an example embodiment, the sets of URLs of a first query (q1) and a second query (q2) may be substantially equivalent if:

$$q1 \subseteq_\alpha q2 \text{ and } q2 \subseteq_\alpha q1$$

With regard to step 1204, in an example embodiment, the first query may be substantially included in the second query if:

$$q1 \subseteq_\alpha q2 \text{ and } q2 \text{ not } \subseteq_\alpha q1$$

These relaxation techniques may optionally be used to filter graph 608 for noisy data, while also reducing the size of size of graph 608, if desired. For further description of relaxation of classifications, refer to the above-referenced Baeza-Yates/Tiberi article (e.g., Section 3.1).

In an embodiment, edges may be shown in graph 608 as directional. For example, an edge may be made directional based on a relative relationship between the queries associated with the nodes connected by the edge. For example, an arrowhead, or other directional indication, may be placed on an edge pointing from the first query to the second query if the first query has a smaller set of URLs than the second query. In alternative embodiments, an edge may be made directional to show other relationships between the first and second queries.

Figure 13:
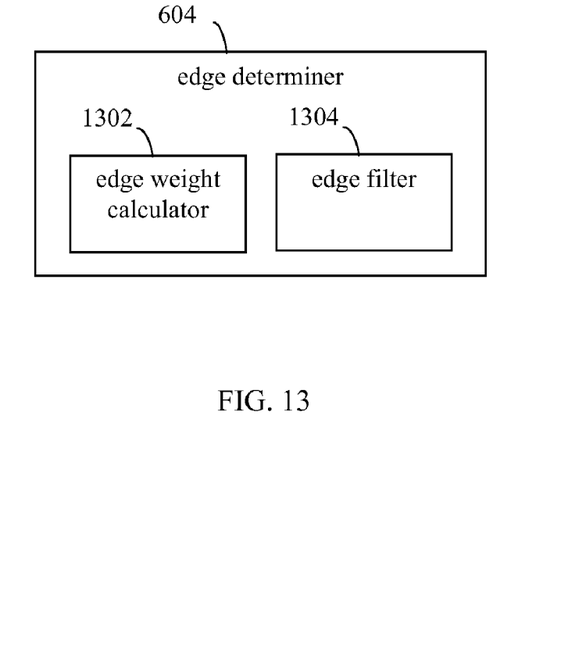
FIG. 13 shows a block diagram of an edge determiner, according to an example embodiment of the present invention.

In an embodiment, weights may be assigned to edges in graph 608. For example, an edge may be assigned a weight according to the similarity of the queries of the nodes connected by the edge. For instance, the weight may be assigned according to the similarity in size of the sets of URLs of the queries. FIG. 13 shows a block diagram of edge determiner 604, according to an example embodiment of the present invention. As shown in FIG. 13, edge determiner 604 includes an edge weight calculator 1302. Edge weight calculator 1302 is configured to calculate a weight for each edge of the plurality of edges determined by edge determiner 604. In an embodiment, an edge weight may be formally a distance function.

For example, in an embodiment, the weight of an edge may be calculated by edge weight calculator 1302 as follows:

$$W(e) = \frac{\bar{q} \cdot \bar{q}'}{|\bar{q}||\bar{q}'|} = \frac{\sum_{i \in D} q(i) \cdot q'(i)}{\sqrt{\sum_{i \in D} q(i)^2} \cdot \sqrt{\sum_{i \in D} q'(i)^2}} \qquad \text{Equation 2}$$

where
 W(e)=the calculated edge weight for an edge e connected between a query pair,
 q=the first query of the query pair,
 q'=the second query of the query pair,
 $\bar{q}$=a vector representation of query q, with each component of the vector assigned a weight equal to the frequency with which the corresponding URL u has been clicked for the query q, and
 D=the number of URLs of the edge.

In alternative embodiments, an edge weight may be calculated in other ways.

After weights are calculated for edges, display of the edges may be modified. For example, edges may be displayed in graph 608 with an indication of their weight. Such an indication may be provided numerically, graphically, or in any other manner. For example, an edge may displayed with a particular color, dot pattern, dash pattern, a gray scale level, any other graphical and/or alphanumeric pattern, or any combination thereof to indicate the weight of the edge.

Furthermore, edges may be filtered from graph 608 based on their weight. For example, lower weight (e.g., weaker relations) edges may be filtered out to reduce noise in graph 608, leaving edges associated with URLs having stronger relations. As shown in FIG. 13, edge determiner 604 includes an edge filter 1304, which is configured to filter edges from being displayed based on edge weight. For instance, edges may be displayed in the graph that have calculated weights greater than a predetermined weight threshold, while edges having calculated weights below the predetermined weight threshold may be filtered out so that they are not displayed. Example weight thresholds include a weight threshold of 0.9, or any other weight threshold, according to the filtering desired/needed for a particular application. Node and edge data signal 612 (in FIG. 6) may be generated by edge determiner 604 to not include the edges filtered out by edge filter 1304.

Edge weight calculator 1302 and edge filter 1304 may be implemented in hardware, software, firmware, or any combination thereof, to perform their functions. For further description of examples of calculating and displaying edge weights, and of filtering graphs according to edge weights, refer to the above-referenced Baeza-Yates/Tiberi article (e.g., Sections 3. and 4.1).

Figure 14:
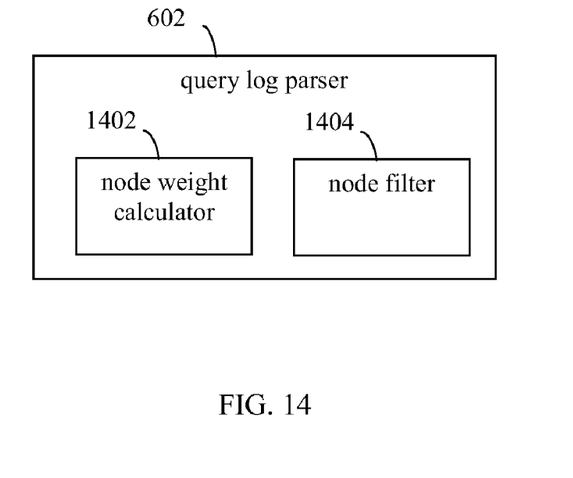
FIG. 14 shows a block diagram of query log parser, according to an example embodiment of the present invention.

In an embodiment, nodes may be filtered from appearing in graph 608. For example, a node may be assigned a weight according to the size of the set of clicked URLs of the query associated with the node. FIG. 14 shows a block diagram of query log parser 602, according to an example embodiment of the present invention. As shown in FIG. 14, query log parser 602 includes a node weight calculator 1402. Node weight calculator 1402 is configured to calculate a weight for each node determined by query log parser 602. Node weight calculator 1402 may calculate a weight for a node in any manner. For example, in an embodiment, node weight calculator 1402 calculates a weight for a node by determining the number of URLs in the set of clicked URLs for the node. In a further embodiment, node weight calculator 1402 may determine a weighted degree of a node as the weight of the node. The weighted degree $\delta w(q)$ of a node may be calculated as follows:

$$\delta w(q) = \frac{1}{\delta(q)} \sum_{q \in e} W(e) \qquad \text{Equation 3}$$

where q=the query associated with the node, $\delta(q)$=the degree of the node, equal to the number of clicked URLs of the node, e=an edge associated with the node, and W(e)=a weight of the edge e (e.g., as calculated according to Equation 2 above).

Thus, Equation 3 determines a weighted degree of a node as a weighted sum of the edge weights associated with the node.

After weights are calculated for nodes, display of the nodes may be modified. For example, nodes may be displayed in graph 608 with an indication of their weight. Such an indication may be provided numerically, graphically, or in any other manner. For example, a node may displayed with a particular shape, as a particular icon, with a particular color, dot pattern, dash pattern, a gray scale level, any other graphical and/or alphanumeric pattern, or any combination thereof to indicate the weight of the node.

Furthermore, nodes may be filtered from graph 608 based on their weight. As shown in FIG. 14, query log parser 602 includes a node filter 1404, which is configured to filter out nodes from being displayed based on node weight. For instance, nodes may be displayed in the graph for queries that have a calculated weight (e.g., size of set of clicked URLs) greater than a predetermined threshold weight value (e.g., threshold number of clicked URLs). Parsed query log data signal 610 (in FIG. 6) may be generated by query log parser 602 to not include the nodes filtered out by node filter 1404.

Node weight calculator 1402 and node filter 1404 may be implemented in hardware, software, firmware, or any combination thereof, to perform their functions. For further description of examples of calculating and displaying node weights, and of filtering graphs according to node weights, refer to the above-referenced Baeza-Yates/Tiberi article.

In an embodiment, a filter for "multitopical" URLs may be present in system 402 of FIG. 4. Multitopical URLs are related to websites that cover many topics or one or more very general topics. Because many different queries can lead to a multitopical URL, such URLs may not be as informative as other types of URLs. Multitopical URLs may be determined and filtered out by counting a number of edges containing each unique URL, and filtering out URLs that have a counted number that is greater than a predetermined (multitopical) threshold.

It is noted that in an embodiment, a "dual graph" may be displayed. In a dual graph, nodes may be displayed that each represents a respective URL. A pair of nodes in the graph may be connected by an edge if at least one query resulted in a click of both of the URLs of the pair of nodes.

Embodiments of the present invention provide effective ways of detecting similar queries (e.g., classified in step 1202 as equivalent), where the queries give rise to identical or substantially the same sets of URLs, and/or related queries (e.g., classified in step 1204 as one query covering the other query), without a linguistic context of the query. Mainly, implicit user feedback in the form of the clicked URLs listed in query logs is used to determine the query relationships. Embodiments can detect the slang of the Web (e.g., a taxonomy used by users to perform searches on the Web). As described herein, embodiments have a variety of uses/applications, such as suggesting, reformulating, and/or expanding queries, as a way of matching queries and advertisements, and further uses/applications. Embodiments are generally computationally non-intensive, with the quantity of calculations typically being linear with regard to the size of the graph.

Example Computer Implementation

Figure 15:
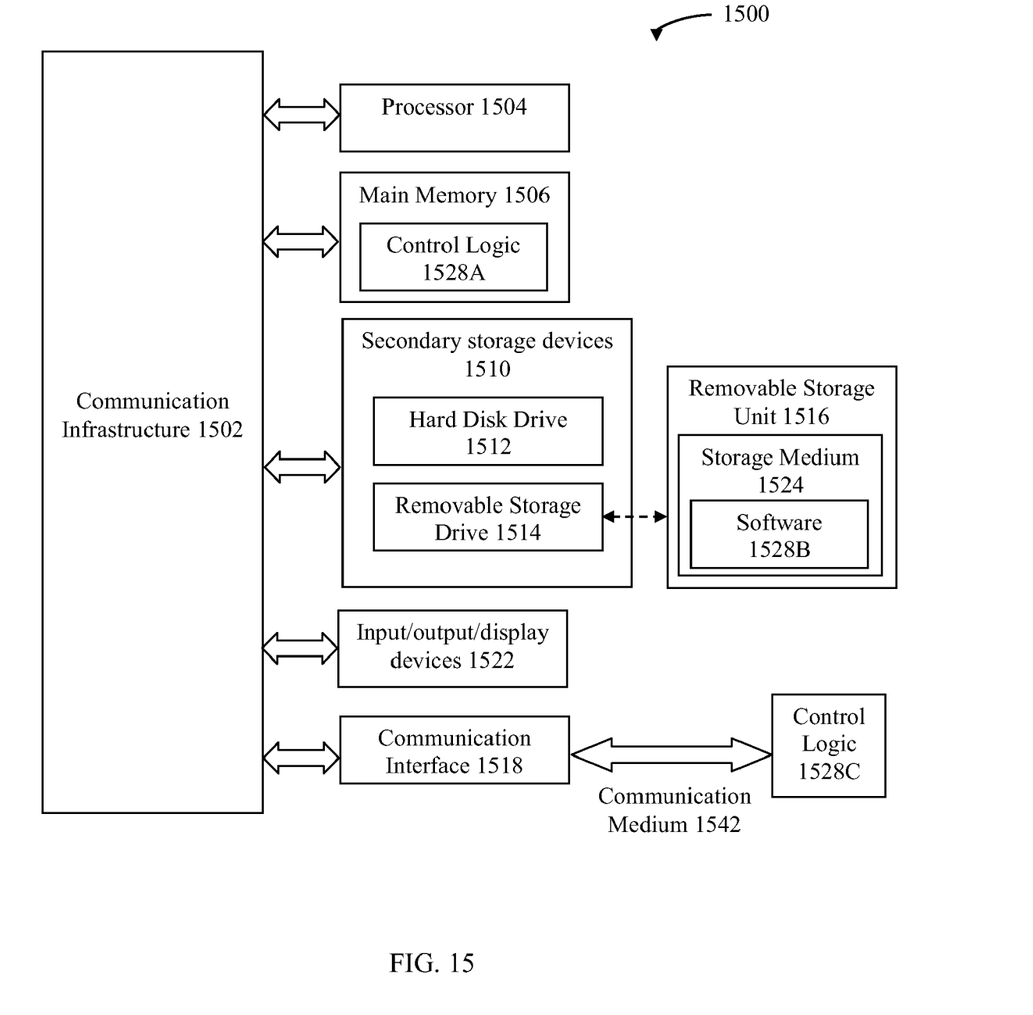
FIG. 15 shows a block diagram of an example computer system in which embodiments of the present invention may be implemented.

The embodiments described herein, including systems, methods/processes, and/or apparatuses, may be implemented using well known servers/computers, such as computer 1500 shown in FIG. 15. For example, search engine 106 of FIG. 1, query log analyzing system 402 of FIG. 4, flowchart 500 shown in FIG. 5, and flowchart 1200 shown in FIG. 12, can be implemented using one or more computers 1500.

Computer 1500 can be any commercially available and well known computer capable of performing the functions described herein, such as computers available from International Business Machines, Apple, Sun, HP, Dell, Cray, etc. Computer 1500 may be any type of computer, including a desktop computer, a server, etc.

Computer 1500 includes one or more processors (also called central processing units, or CPUs), such as a processor 1504. Processor 1504 is connected to a communication infrastructure 1502, such as a communication bus. In some embodiments, processor 1504 can simultaneously operate multiple computing threads.

Computer 1500 also includes a primary or main memory 1506, such as random access memory (RAM). Main memory 1506 has stored therein control logic 1528A (computer software), and data.

Computer 1500 also includes one or more secondary storage devices 1510. Secondary storage devices 1510 include, for example, a hard disk drive 1512 and/or a removable storage device or drive 1514, as well as other types of storage devices, such as memory cards and memory sticks. For instance, computer 1500 may include an industry standard interface, such a universal serial bus (USB) interface for interfacing with devices such as a memory stick. Removable storage drive 1514 represents a floppy disk drive, a magnetic tape drive, a compact disk drive, an optical storage device, tape backup, etc.

Removable storage drive 1514 interacts with a removable storage unit 1516. Removable storage unit 1516 includes a computer usable or readable storage medium 1524 having stored therein computer software 1528B (control logic) and/or data. Removable storage unit 1516 represents a floppy disk, magnetic tape, compact disk, DVD, optical storage disk, or any other computer data storage device. Removable storage drive 1514 reads from and/or writes to removable storage unit 1516 in a well known manner.

Computer 1500 also includes input/output/display devices 1522, such as monitors, keyboards, pointing devices, etc.

Computer 1500 further includes a communication or network interface 1518. Communication interface 1518 enables the computer 1500 to communicate with remote devices. For example, communication interface 1518 allows computer 1500 to communicate over communication networks or mediums 1542 (representing a form of a computer usable or readable medium), such as LANs, WANs, the Internet, etc. Network interface 1518 may interface with remote sites or networks via wired or wireless connections.

Control logic 1528C may be transmitted to and from computer 1500 via the communication medium 1542. More particularly, computer 1500 may receive and transmit carrier waves (electromagnetic signals) modulated with control logic 1528C via communication medium 1542.

Any apparatus or manufacture comprising a computer usable or readable medium having control logic (software) stored therein is referred to herein as a computer program product or program storage device. This includes, but is not limited to, computer 1500, main memory 1506, secondary storage devices 1510, removable storage unit 1516 and carrier waves modulated with control logic 1528C. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of associating queries of a query log that lists a plurality of queries and a plurality of clicked uniform resource locators (URL), the plurality of clicked URLs including a set of one or more clicked URLs for each query of the plurality of queries, comprising:
designating each query of the plurality of queries to be a node of a plurality of nodes using at least one processor;
determining a plurality of edges, including designating a URL to be an edge for a pair of queries if the URL is indicated as clicked in a set of clicked URLs for a first query of the pair and in a set of clicked URLs for a second query of the pair; and
displaying the plurality of nodes and the plurality of edges in a graph.

2. The method of claim 1, wherein said displaying the plurality of nodes and the plurality of edges in a graph comprises:
displaying each edge in the graph as a line connected between a pair of nodes displayed in the graph that correspond to the pair of queries having sets of clicked URLs that both indicate the URL of the edge as clicked.

3. The method of claim 2, further comprising:
classifying each edge;
wherein said displaying each edge in the graph as a line connected between a pair of nodes displayed in the graph that correspond to the pair of queries having sets of clicked URLs that both indicate the URL of the edge as clicked further comprises
displaying the line to graphically indicate the classification of the edge.

4. The method of claim 3, wherein said classifying each edge comprises:
classifying an edge as having a first classification if a first query and a second query of the pair of queries that both indicate the URL of the edge as clicked have substantially equivalent sets of clicked URLs;
classifying the edge as having a second classification if the set of clicked URLs of the first query is lesser in size than and substantially included in the set of clicked URLs of the second query; and
classifying the edge as having a third classification if the set of clicked URLs of the first query is overlapping with the set of clicked URLs of the second query and the edge is not classifiable according to the first or second classifications.

5. The method of claim 1, further comprising:
calculating a weight for each edge of the plurality of edges.

6. The method of claim 5, wherein said displaying the plurality of nodes and the plurality of edges in a graph comprises:
only displaying edges in the graph that have calculated weights greater than a predetermined weight threshold.

7. The method of claim 1, wherein said displaying the plurality of nodes and the plurality of edges in a graph comprises:
only displaying nodes in the graph for queries having sets of one or more clicked URLs that include numbers of clicked URLs greater than a predetermined threshold number of clicked URLs.

8. A query log analyzing system, comprising:
at least one server that includes at least one processor;
a query log parser constructor implemented at least partially by the at least one processor that is configured to receive a query log that lists a plurality of queries and a plurality of clicked uniform resource locators (URL), the plurality of clicked URLs including a set of one or more clicked URLs for each query of the plurality of queries, wherein the query log parser is configured to designate each query of the plurality of queries to be a node of a plurality of nodes; and an edge determiner configured to determine a plurality of edges for the plurality of URLs of the query log, wherein the edge determiner is configured to designate a URL to be an edge for a pair of queries if the URL is indicated as clicked in a set of clicked URLs for a first query of the pair and in a set of clicked URLs for a second query of the pair.

9. The system of claim 8, further comprising:
a display module configured to enable display the plurality of nodes and the plurality of edges in a graph.

10. The system of claim 9, wherein the display module is configured to enable display of each edge in the graph as a line connected between a pair of nodes displayed in the graph that correspond to the pair of queries having sets of clicked URLs that both indicate the URL of the edge as clicked.

11. The system of claim 10, further comprising:
an edge classifier configured to classify each edge;
wherein the display module is configured to display the line with a graphical indication of the classification of the edge corresponding to the line.

12. The system of claim 11, wherein the edge classifier is configured to classify an edge as having a first classification if a first query and a second query of the pair of queries that both indicate the URL of the edge as clicked have substantially equivalent sets of clicked URLs;
wherein the edge classifier is configured to classify the edge as having a second classification if the set of clicked URLs of the first query is lesser in size than and substantially included in the set of clicked URLs of the second query; and
wherein the edge classifier is configured to classify the edge as having a third classification if the set of clicked URLs of the first query is overlapping with the set of clicked URLs of the second query and the edge is not classifiable according to the first or second classifications.

13. The system of claim 9, further comprising:
an edge weight calculator configured to calculate a weight for each edge of the plurality of edges.

14. The system of claim 13, further comprising:
an edge filter configured to filter edges from display in the graph that have calculated weights greater than a predetermined weight threshold.

15. The system of claim 9, further comprising:
a node filter configured to filter nodes from display in the graph for queries having sets of one or more clicked URLs that include numbers of clicked URLs greater than a predetermined threshold number of clicked URLs.

16. A computer program product comprising a computer usable storage medium having computer readable program code means embodied in said medium for associating queries of a query log that lists a plurality of queries and a plurality of clicked uniform resource locators (URL), the plurality of clicked URLs including a set of one or more clicked URLs for each query of the plurality of queries, the computer program product comprising:
a first computer readable program code means for enabling a processor to designate each query of the plurality of queries to be a node of a plurality of nodes;
a second computer readable program code means for enabling a processor to determine a plurality of edges, including computer readable program code means for enabling a processor to designate a URL to be an edge for a pair of queries if the URL is indicated as clicked in a set of clicked URLs for a first query of the pair and in a set of clicked URLs for a second query of the pair; and
a third computer readable program code means for enabling a processor to cause display of the plurality of nodes and the plurality of edges in a graph.

17. The computer program product of claim 16, wherein said third computer readable program code means comprises:
a fourth computer readable program code means for enabling a processor to cause display of each edge in the graph as a line connected between a pair of nodes displayed in the graph that correspond to the pair of queries having sets of clicked URLs that both indicate the URL of the edge as clicked.

18. The computer program product of claim 17, further comprising:
a fifth computer readable program code means for enabling a processor to classify each edge;
wherein said fourth computer readable program code means further comprises
a sixth computer readable program code means for enabling a processor to cause display of the line to graphically indicate the classification of the edge.

19. The computer program product of claim 18, wherein said fifth computer readable program code means comprises:
a seventh computer readable program code means for enabling a processor to classify an edge as having a first classification if a first query and a second query of the pair of queries that both indicate the URL of the edge as clicked have substantially equivalent sets of clicked URLs;
a eighth computer readable program code means for enabling a processor to classify the edge as having a second classification if the set of clicked URLs of the first query is lesser in size than and substantially included in the set of clicked URLs of the second query; and
a ninth computer readable program code means for enabling a processor to classify the edge as having a third classification if the set of clicked URLs of the first query is overlapping with the set of clicked URLs of the second query and the edge is not classifiable according to the first or second classifications.

20. The computer program product of claim 16, further comprising:
a fifth computer readable program code means for enabling a processor to calculate a weight for each edge of the plurality of edges.

21. The computer program product of claim 20, wherein said fourth computer readable program code means comprises:
a sixth computer readable program code means for enabling a processor to filter edges from display in the graph that have calculated weights greater than a predetermined weight threshold.

22. The computer program product of claim 16, wherein said fourth computer readable program code means comprises:
a fifth computer readable program code means for enabling a processor to filter nodes from display in the graph for queries having sets of one or more clicked URLs that include numbers of clicked URLs greater than a predetermined threshold number of clicked URLs.

* * * * *